United States Patent
Zhang et al.

(10) Patent No.: US 7,161,759 B1
(45) Date of Patent: Jan. 9, 2007

(54) SELF SERVO WRITING USING SERVO BURST EDGE ERRORS FOR COMPOUND ERROR CORRECTION

(75) Inventors: Xiao (John) Zhang, Cupertino, CA (US); Lin Guo, Milpitas, CA (US)

(73) Assignee: Maxtor Corporation, Scotts Valley, CA (US)

( * ) Notice: Subject to any disclaimer, the term of this patent is extended or adjusted under 35 U.S.C. 154(b) by 65 days.

(21) Appl. No.: 10/127,015

(22) Filed: Apr. 19, 2002

Related U.S. Application Data

(60) Provisional application No. 60/285,015, filed on Apr. 19, 2001.

(51) Int. Cl.
*G11B 21/02* (2006.01)
*G11B 5/596* (2006.01)

(52) U.S. Cl. .................... 360/75; 360/77.04
(58) Field of Classification Search .......... 360/75, 360/77.04
See application file for complete search history.

(56) References Cited

U.S. PATENT DOCUMENTS

| | | | |
|---|---|---|---|
| 4,414,589 A | 11/1983 | Oliver et al. ............ | 360/77 |
| 4,912,576 A | 3/1990 | Janz ...................... | 360/77.07 |
| 5,485,322 A | 1/1996 | Chainer et al. .......... | 360/51 |
| 5,907,447 A | 5/1999 | Yarmchuk et al. ........ | 360/75 |
| 6,476,989 B1* | 11/2002 | Chainer et al. .......... | 360/31 |
| 6,608,731 B1* | 8/2003 | Szita ..................... | 360/75 |
| 6,765,744 B1* | 7/2004 | Gomez et al. ............ | 360/75 |

FOREIGN PATENT DOCUMENTS

WO   WO 94/11864   5/1994

* cited by examiner

*Primary Examiner*—Andrew L. Sniezek
(74) *Attorney, Agent, or Firm*—Teipal S. Hansra

(57) ABSTRACT

The present invention provides self-servo writing by which self-propagated servo pattern track shape errors are reduced or eliminated. The method includes providing first servo bursts on a first track, measuring edge errors of the first servo bursts, and self-servo writing second servo bursts to a second track using different combinations of the edge errors to adjust the position error signals for the second servo bursts.

80 Claims, 7 Drawing Sheets

SELF SERVO WRITING USING SERVO BURST EDGE ERRORS FOR COMPOUND ERROR CORRECTION

RELATED APPLICATION

This application claims priority from U.S. Provisional Application Ser. No. 60/285,015, filed on Apr. 19, 2001, which is incorporated herein by reference.

FIELD OF THE INVENTION

The present invention relates to disk drives, and more particularly to correcting compound errors during self-servo writing.

BACKGROUND OF THE INVENTION

Disk drives are well known in the computer art for providing secondary mass storage with random access. A disk drive includes one or more magnetic data storage disks rotated on a spindle by a spindle motor within an enclosed housing. A magnetic read/write head (transducer or slider) with an air bearing surface is placed on an actuator arm and positioned close to a corresponding disk.

The close proximity of the head to the disk enables high-resolution servo patterns and user data to be recorded on the disk. The servo patterns are written in servo sectors which are interleaved between data sectors. The servo patterns provide a servo controller with head position information to enable a head positioner, such as a rotary voice coil motor, to move the head from track-to-track during random access seek operations, and to maintain the head in proper alignment with a track during track following operations when user data is written to or read from the available data sectors on the track. The servo patterns include short servo bursts of constant frequency, precisely located relative to a track centerline. The servo patterns allow the head to follow the track centerline even when the track is non-circular, as can occur with spindle wobble, disk slip and thermal expansion.

The servo patterns have been written by an external servo track writer that supports the disk drive on a large granite block to reduce vibration. However, servo track writers are expensive, require a clean room environment and expose the head and the disk to the environment. The servo patterns have also been written by the disk drive during self-servo writing without a servo track writer. Self-servo writing involves the head reading position and timing information from the disk, the head being positioned using the position information and the head writing the servo patterns to the disk using the timing information.

Self-servo writing suffers from self-propagation, as described in U.S. Pat. No. 5,907,447 to Yarmchuk et al. During self-propagation, servo bursts in a previous track are used to position the head as the head writes servo bursts to the next track. However, perturbations in the servo bursts in the previous track propagate to the servo bursts in the next track. Compound errors that propagate across the tracks can lead to excessive track non-circularity.

There is, therefore, a need to reduce compound errors due to self-propagation during self-servo writing in a disk drive.

SUMMARY OF THE INVENTION

The present invention provides self-servo writing by which self-propagated servo pattern track shape errors are reduced or eliminated. The method includes providing first servo bursts on a first track, measuring edge errors of the first servo bursts, and self-servo writing second servo bursts to a second track using different combinations of the edge errors to adjust the position error signals for the second servo bursts.

The method can include providing A, B, C and D first servo bursts on the first track, measuring top and bottom edge errors of the A, B, C and D first servo bursts, and self-servo writing A, B, C, and D second servo bursts that are radially aligned with the A, B, C and D first servo bursts, respectively, using different combinations of the edge errors during different revolutions of the disk.

BRIEF DESCRIPTION OF THE DRAWINGS

These and other features, aspects and advantages of the present invention will become understood with reference to the following description and accompanying figures where.

DETAILED DESCRIPTION OF THE INVENTION

Figure 1:
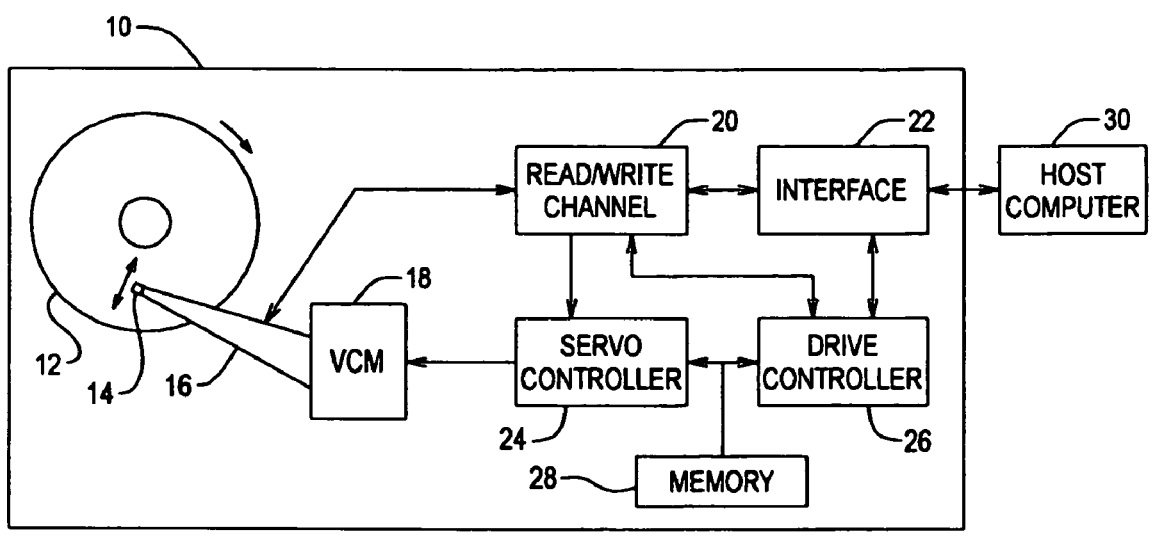
FIG. 1 shows a disk drive in which the present can be implemented.

FIG. 1 shows a disk drive 10 in which the present invention can be implemented. The disk drive 10 includes a data storage disk 12, a head 14 (having a read element and a write element), an actuator arm assembly 16, a voice coil motor (VCM) 18, a read/write channel 20, an interface 22, a servo controller 24, a drive controller 26 and a memory 28. The disk drive 10 is coupled to an external host computer 30 that uses the disk drive 10 as a mass storage device.

The disk drive 10 receives read and write requests from the host computer 30 and carries out the requests by performing data transfers between the disk 12 and the host computer 30. In a preferred embodiment, the disk drive 10 includes multiple disks 12 in a vertical stack and multiple heads 14 with one head 14 for each operative disk surface. Typically, both surfaces of each disk 12 store user data and therefore the disk drive 10 includes two heads 14 for each disk 12. Single-sided disk arrangements can also be used.

The interface 22 provides an interface between the disk drive 10 and the host computer 30. During read and write operations, the interface 22 provides a communications path that includes data buffering between the channel 20 and the host computer 30. In addition, the interface 22 receives commands and requests from the host computer 30 and directs them to the drive controller 26. The drive controller 26 carries out the commands by appropriately controlling the elements within the disk drive 10.

The VCM 18 positions the head 14 with respect to the disk 12 in response to a control signal generated by the servo controller 24. The head 14 is coupled to the actuator arm assembly 16 and thus moves under the influence of the VCM 18. When performing a read or write operation, the drive controller 26 instructs the servo controller 24 to move the head 14 to a target track on the disk 12 so that a data transfer can take place. The servo controller 24 then generates a control signal to move the head 14 from the present track to a target track during a seek operation.

Once the head 14 arrives at the target track, the servo controller 24 enters a track following operation during which the head 14 is maintained in a substantially centered position above the target track. The data transfer between the head 14 and the target track occurs during the track following operation.

The channel 20 performs data transformations to provide communication between the disk 12 and the host computer 30. For example, during a write operation, the channel 20 converts digital data received from the host computer 30 into an analog write current for delivery to the head 14. During a read operation, the channel 20 converts an analog read signal received from the head 14 into a digital representation that can be recognized by the host computer 30. The channel 20 also separates out servo information read by the head 14 and directs the servo information to the servo controller 24 for positioning the head 14.

The blocks illustrated in FIG. 1 are functional in nature and do not necessarily represent discrete hardware elements. For example, two or more of the functional blocks within the disk drive 10 can be implemented in software in a common digital processor.

Figure 2:
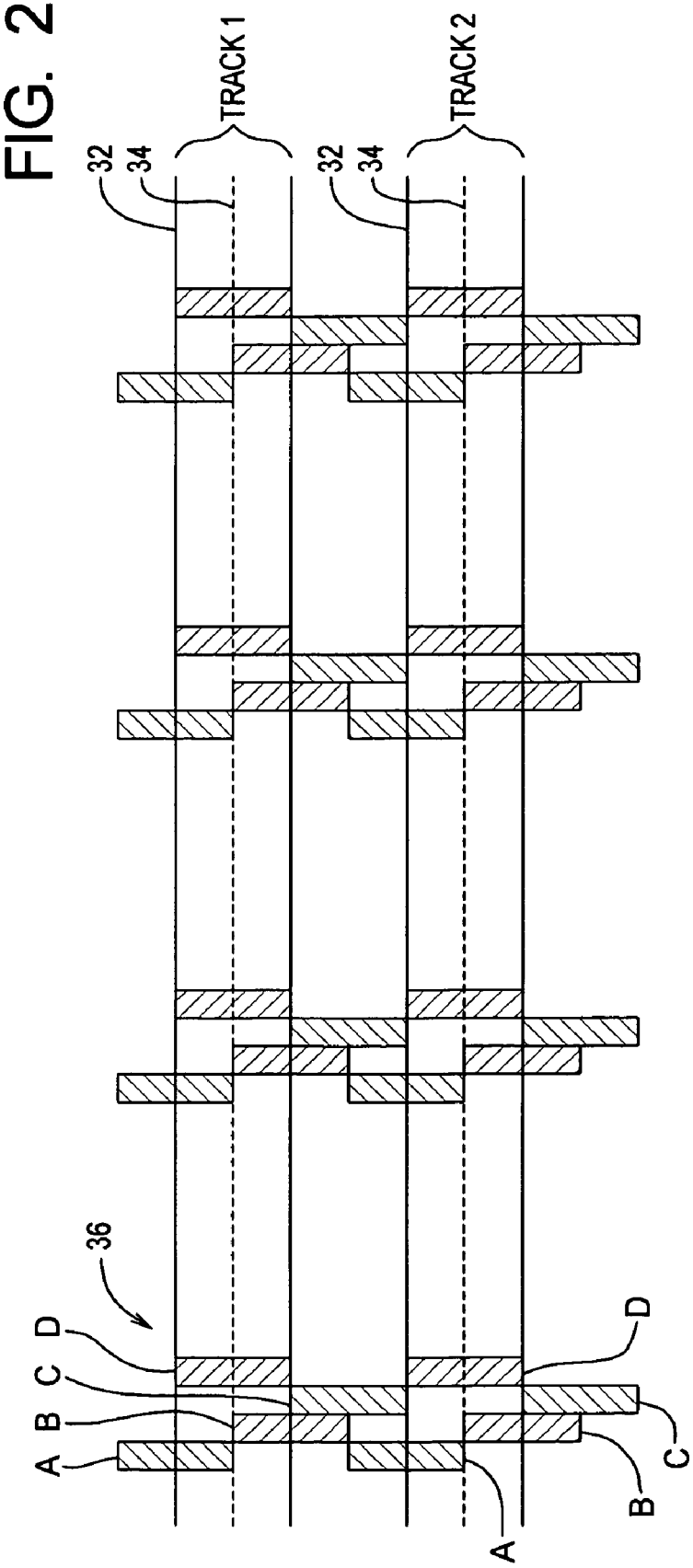
FIG. 2 shows servo bursts written on circular tracks.

FIG. 2 shows servo busts written on circular tracks. The disk 12 includes tracks 32 with track centerlines 34. The tracks 32 are centered relative to the track centerlines 34, and therefore are circular. The tracks 32 also include servo sectors 36 arranged in servo wedges that extend radially across the tracks 32. The servo sectors 36 each include A, B, C and D servo bursts. In a given servo sector 36, the servo bursts are circumferentially staggered and radially offset. Furthermore, the servo sectors 36 in different tracks 32 are radially aligned, and the servo bursts in the servo sectors 36 in different tracks 32 are radially aligned. For instance, in radially aligned servo sectors 36 in tracks 1 and 2, the A servo bursts are radially aligned, the B servo bursts are radially aligned, the C servo bursts are radially aligned, and the D servo bursts are radially aligned.

The servo bursts each include magnetic flux transitions, and when the head 14 passes over the magnetic flux transitions it generates a read signal with repeating cycle variations. The channel 20 demodulates and decodes the read signal to provide a position error signal (PES) that indicates the position of the head 14 relative to the track centerline. The servo controller 24 positions the head 14 relative to the track centerline in response to the PES during track following operations. Thus, the PES reflects the shape of the track. A distorted (non-circular) track shape changes the servo burst locations, thereby changing the PES.

The PES is based various difference signals from the servo bursts. The null (N) signal is the A–B signal (the read signal amplitude from the A servo burst minus the read signal amplitude from the B servo burst), and the quadrature (Q) signal is the C–D signal (the read signal amplitude from the C servo burst minus the read signal amplitude from the D servo burst). The PES is based on the N signal when the head 14 is within about 0.25 track width from the track centerline 34, and the Q signal when the head is within about 0.25 to 0.75 track width from the track centerline 34. The PES is based on the N–Q and N+Q signals to obtain a larger linear range.

The N and Q signals are cyclic as the head 14 moves circumferentially across the disk 12 and are 90 degrees out of phase. When the head 14 is tracking along the track centerline, the N signal should be zero because the head 14 receives the same magnetic flux from the A and B servo bursts. When the head 14 is tracking ½ track width from the track centerline, the Q signal should be zero because the head 14 receives the same magnetic flux from the C and D servo bursts.

Figure 3:
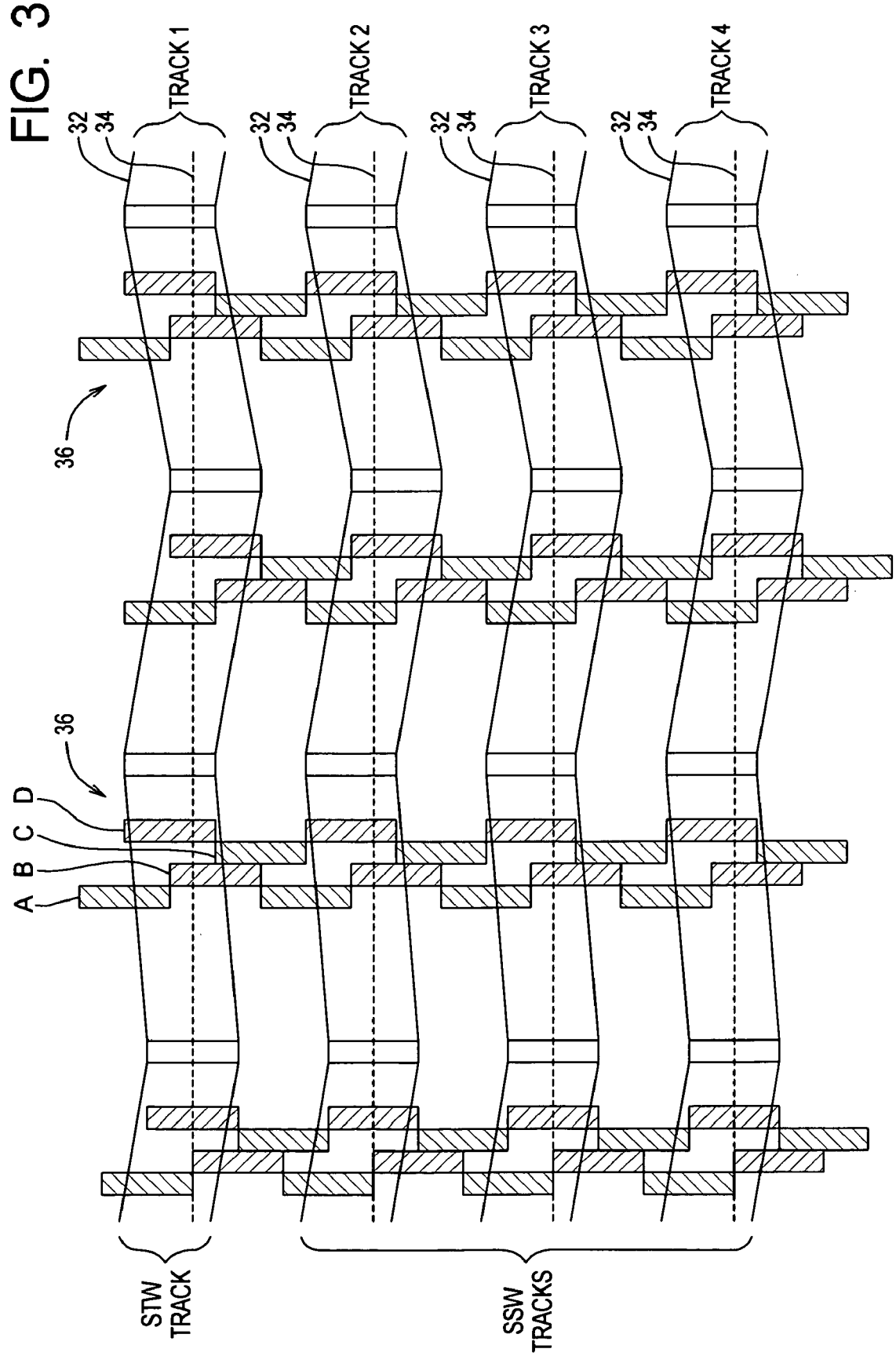
FIG. 3 shows servo busts written on non-circular tracks.

FIG. 3 shows servo busts written on non-circular tracks. The tracks 32 contain perturbations relative to the track centerlines 34, and therefore are non-circular. These track perturbations (distortions) are written-in run-out (WRO) that occur as edge errors in the servo bursts.

A first band of tracks 32 that includes track 1 are written to the disk 12 by a servo track writer (STW). The first band of tracks 32 include WRO as repeatable run-out (RRO). Thereafter, a second band of tracks 32 that includes tracks 2, 3 and 4 are written to the disk 12 by self-servo writing (SSW). Unfortunately, the perturbations self-propagate from track-to-track during the self-servo writing. For instance, the perturbations in track 1 propagate to track 2 as the head 14 is positioned using a PES from track 1 and writes servo bursts to track 2, the perturbations in track 2 propagate to track 3 as the head 14 is positioned using a PES from track 2 and writes servo bursts to track 3, and the perturbations in track 3 propagate to track 4 as the head 14 is positioned using a PES from track 3 and writes servo bursts to track 4. As a result, the perturbations in track 1 create a compoundable error that propagates across the tracks. That is, each track compounds the errors from the previous tracks. Furthermore, the tracks contain WRO that compounds not only RRO from the previous tracks, but also non-repeatable run-out (NRRO) (such as random mechanical disturbance and electronic noise) from the previous tracks. As a result, the compound errors can lead to excessive track non-circularity that cause the disk drive 10 to fail.

Figure 4:
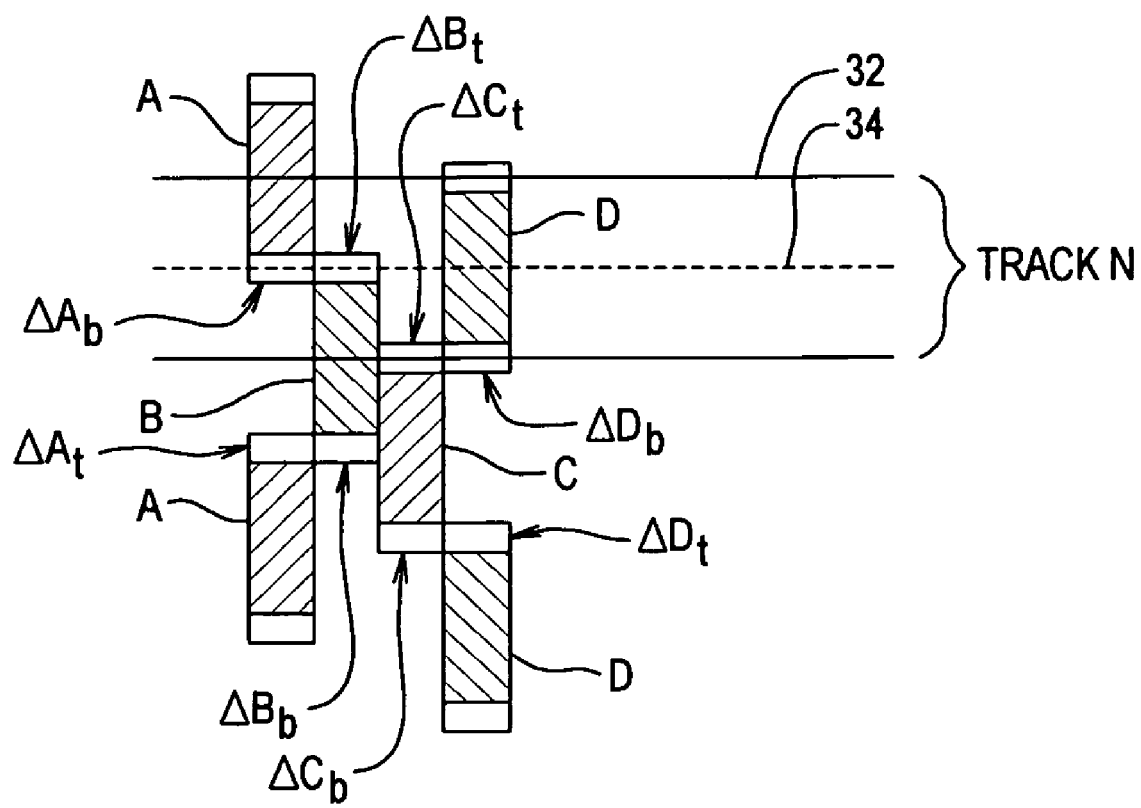
FIG. 4 shows servo bursts that contain edge errors.

FIG. 4 shows servo bursts that contain edge errors. The servo bursts each contain top and bottom edge errors as WRO. In particular, the A servo burst contains a top edge error $\Delta A_t$ and a bottom edge error $\Delta A_b$, the B servo burst contains a top edge error $\Delta B_t$ and a bottom edge error $\Delta B_b$, the C servo burst contains a top edge error $\Delta C_t$ and a bottom edge error $\Delta C_b$, and the D servo burst contains a top edge error $\Delta D_t$ and a bottom edge error $\Delta D_b$.

The head 14 writes the A, B, C and D servo bursts to the track N at six radial positions during eight revolutions of the disk 12 during self-servo writing. In addition, the head 14 is positioned using a PES from a previously written track N−1 (not shown). The head 14 is moved to a first radial position and writes the A servo burst with top edge error $\Delta A_t$ during a first revolution of the disk 12. The head 14 is then moved down to a second radial position and writes the D servo burst with top edge error $\Delta D_t$ during a second revolution of the disk 12. The head 14 is then moved down to a third radial position and trims the bottom edge of the A servo burst with bottom edge error $\Delta A_b$ during a third revolution of the disk 12. The head 14 is then maintained at the third radial position and writes the B servo burst with top edge error $\Delta B_t$ during a fourth revolution of the disk 12. The head 14 is then moved down to a fourth radial position and trims the bottom edge of the D servo burst during a fifth revolution of the disk 12. The head 14 is then maintained at the fourth radial position and writes the C servo burst with top edge error $\Delta C_t$ during a sixth revolution of the disk 12. The head 14 is then moved down to a fifth radial position and trims the bottom edge of the B servo burst with bottom edge error $\Delta B_b$ during a sixth revolution of the disk 12. The head 14 is then maintained at the fifth radial position and writes another A servo burst with top edge error $\Delta A_t$ during a seventh revolution of the disk 12. The head 14 is then moved down to a sixth radial position and trims the bottom edge of the C servo burst with bottom edge error $\Delta C_b$ during an eighth revolution of the disk 12. The head 14 is then maintained at the sixth radial position and writes another D servo burst with top edge error $\Delta D_t$ during a ninth revolution of the disk 12. And so on. Furthermore, the servo bursts are written in this manner in each servo sector on the track.

The PES contains compound errors that propagate from track-to-track as follows:

$PES(N)=E \times NRRO(N-1)+NRRO(N)$ $PES(N+1)=E \times [E \times NRRO(N-1)+NRRO(N)]+NRRO(N+1)$ $PES(N+2)=E \times \{E \times [E \times NRRO(N-1)+NRRO(N)]+NRRO(N+1)\}+NRRO(N+2)$ where E represents a control loop error transfer function and track N−1 has zero WRO.

The present invention prevents self-propagation of compound errors by removing WRO at different radial positions in a track based on different combinations of servo burst edge errors in a previous track. For example, the A, B, C and D servo bursts have eight edge errors, and the PES is based on a selected combination of the edge errors as the head 14 steps through different radial positions in the next track during self-servo writing. The edge errors are selected based on the track following mode (the N signal, the Q signal and combinations thereof) and the WRO is a linear combination of the edge errors. The PES is the target head position plus the WRO. Therefore, the PES is adjusted to remove the WRO by subtracting the edge errors.

Table I illustrates eight track following modes that use eight combinations of the top and bottom edge errors for the A, B, C and D servo bursts written during eight revolutions of the disk.

TABLE I

| Mode | A | B | C | D | PES | WRO |
|---|---|---|---|---|---|---|
| N | $A + \Delta A_b$ | $B + \Delta B_t$ | | | $(A + \Delta A_b) - (B + \Delta B_t)$ | $\Delta A_b - \Delta B_t$ |
| N − Q | $A + \Delta A_b$ | $B + \Delta B_t$ | $C + \Delta C_t$ | $D + \Delta D_b$ | $(A + \Delta A_b) - (B + \Delta B_t) - (C + \Delta C_t) + (D + \Delta D_b)$ | $\Delta A_b - \Delta B_t - \Delta C_t + \Delta D_b$ |
| −Q | | | $C + \Delta C_t$ | $D + \Delta D_b$ | $-(C + \Delta C_b) + (D + \Delta D_t)$ | $-\Delta C_t + \Delta D_b$ |
| −(N + Q) | $A + \Delta A_t$ | $B + \Delta B_b$ | $C + \Delta C_t$ | $D + \Delta D_b$ | $-(A + \Delta A_t) + (B + \Delta B_b) - (C + \Delta C_t) + (D + \Delta D_b)$ | $-\Delta A_t + \Delta B_b - \Delta C_t + \Delta D_b$ |
| −N | $A + \Delta A_t$ | $B + \Delta B_b$ | | | $-(A + \Delta A_t) + (B + \Delta B_b)$ | $-\Delta A_t + \Delta B_b$ |
| −(N − Q) | $A + \Delta A_t$ | $B + \Delta B_b$ | $C + \Delta C_b$ | $D + \Delta D_t$ | $-(A + \Delta A_t) + (B + \Delta B_b) + (C + \Delta C_t) - (D + \Delta D_b)$ | $-\Delta A_t + \Delta B_b + \Delta C_b - \Delta D_t$ |
| Q | | | $C + \Delta C_b$ | $D + \Delta D_t$ | $(C + \Delta C_b) - (D + \Delta D_t)$ | $\Delta C_b - \Delta D_t$ |
| N + Q | $A + \Delta A_b$ | $B + \Delta B_t$ | $C + \Delta C_b$ | $D + \Delta D_t$ | $(A + \Delta A_b) - (B + \Delta B_t) + (C + \Delta C_b) - (D + \Delta D_t)$ | $\Delta A_b - \Delta B_t + \Delta C_b - \Delta D_t$ |

In another embodiment, the A, B, C and D servo bursts are written during six revolutions of the disk. The bottom edge of the A servo burst is trimmed during the same disk revolution that the top edge of the B servo burst is written, and the top edge of the C servo burst is written during the same disk revolution that the bottom edge of the D servo burst is trimmed. As a result, the bottom edge of the A servo burst and the top edge of the B servo burst have the same error with opposite sign, and the top edge of the C servo burst and the bottom edge of the D servo burst have the same error with opposite sign.

Table II illustrates eight track following modes that use eight combinations of the top and bottom edge errors for the A, B, C and D servo bursts written during six revolutions of the disk.

TABLE II

| Mode | A | B | C | D | PES | WRO |
|---|---|---|---|---|---|---|
| N | $A + \Delta A_b$ | $B - \Delta B_t$ | | | $(A + \Delta A_b) - (B - \Delta B_t)$ | $2\Delta A_b = 2\Delta B_t$ |
| −N | $A + \Delta A_t$ | $B - \Delta B_b$ | | | $-(A + \Delta A_t) + (B - \Delta B_b)$ | $-2\Delta A_t = -2\Delta B_b$ |
| Q | | | $C + \Delta C_b$ | $D - \Delta D_t$ | $(C + \Delta C_b) - (D - \Delta D_t)$ | $2\Delta C_b = 2\Delta D_t$ |
| −Q | | | $C + \Delta C_t$ | $D - \Delta D_b$ | $-(C + \Delta C_t) + (D - \Delta D_t)$ | $-2\Delta C_t = -2\Delta D_b$ |
| N + Q | $A + \Delta A_b$ | $B - \Delta B_t$ | $C + \Delta C_b$ | $D - \Delta D_t$ | $(A + \Delta A_b) - (B - \Delta B_t) + (C + \Delta C_b) - (D - \Delta D_t)$ | $2\Delta A_b + 2\Delta C_b = 2\Delta B_t + 2\Delta D_t$ |
| −(N + Q) | $A + \Delta A_t$ | $B - \Delta B_b$ | $C + \Delta C_t$ | $D - \Delta D_b$ | $-(A + \Delta A_t) + (B - \Delta B_b) - (C + \Delta C_t) + (D - \Delta D_b)$ | $-2\Delta A_t - 2\Delta C_t = -2\Delta B_b - 2\Delta D_b$ |

TABLE II-continued

| Mode | A | B | C | D | PES | WRO |
|---|---|---|---|---|---|---|
| N − Q | $A + \Delta A_b$ | $B - \Delta B_t$ | $C + \Delta C_t$ | $D - \Delta D_b$ | $(A + \Delta A_b) - (B - \Delta B_t) - (C + \Delta C_b) + (D - \Delta D_t)$ | $2\Delta A_b - 2\Delta C_b = 2\Delta B_t - 2\Delta D_t$ |
| −(N − Q) | $A + \Delta A_t$ | $B - \Delta B_b$ | $C + \Delta C_b$ | $D - \Delta D_t$ | $-(A + \Delta A_t) + (B - \Delta B_b) + (C + \Delta C_t) - (D - \Delta D_b)$ | $-2\Delta A_t + 2\Delta C_t = -2\Delta B_b + 2\Delta D_b$ |

In another embodiment, the A and B servo bursts are written by the servo track writer and have fixed but different WRO contributions than the C and D servo bursts. As a result, there is no WRO correction for the A and B servo bursts, and the WRO is caused only by the edge errors of the C and D servo bursts.

Table III illustrates eight track following modes that use two combinations of the top and bottom edge errors for the C and D servo bursts.

TABLE III

| Mode | A | B | C | D | PES | WRO |
|---|---|---|---|---|---|---|
| N | $A + \Delta A_b$ | $B + \Delta B_t$ | | | $(A + \Delta A_b) - (B + \Delta B_t)$ | 0 |
| N − Q | $A + \Delta A_b$ | $B + \Delta B_t$ | $C + \Delta C_t$ | $D + \Delta D_b$ | $(A + \Delta A_b) - (B + \Delta B_t) - (C + \Delta C_b) + (D + \Delta D_t)$ | $-\Delta C_t + \Delta D_b$ |
| −Q | | | $C + \Delta C_t$ | $D + \Delta D_b$ | $-(C + \Delta C_b) + (D + \Delta D_t)$ | $-\Delta C_t + \Delta D_b$ |
| −(N + Q) | $A + \Delta A_t$ | $B + \Delta B_b$ | $C + \Delta C_t$ | $D + \Delta D_b$ | $-(A + \Delta A_t) + (B + \Delta B_b) - (C + \Delta C_t) + (D + \Delta D_b)$ | $-\Delta C_t + \Delta D_b$ |
| −N | $A + \Delta A_t$ | $B + \Delta B_b$ | | | $-(A + \Delta A_t) + (B + \Delta B_b)$ | 0 |
| −(N − Q) | $A + \Delta A_t$ | $B + \Delta B_b$ | $C + \Delta C_b$ | $D + \Delta D_t$ | $-(A + \Delta A_t) + (B + \Delta B_b) + (C + \Delta C_t) - (D + \Delta D_b)$ | $\Delta C_b - \Delta D_t$ |
| Q | | | $C + \Delta C_b$ | $D + \Delta D_t$ | $(C + \Delta C_b) - (D + \Delta D_t)$ | $\Delta C_b - \Delta D_t$ |
| N + Q | $A + \Delta A_b$ | $B + \Delta B_t$ | $C + \Delta C_b$ | $D + \Delta D_t$ | $(A + \Delta A_b) - (B + \Delta B_t) + (C + \Delta C_b) - (D + \Delta D_t)$ | $\Delta C_b - \Delta D_t$ |

Figure 5:
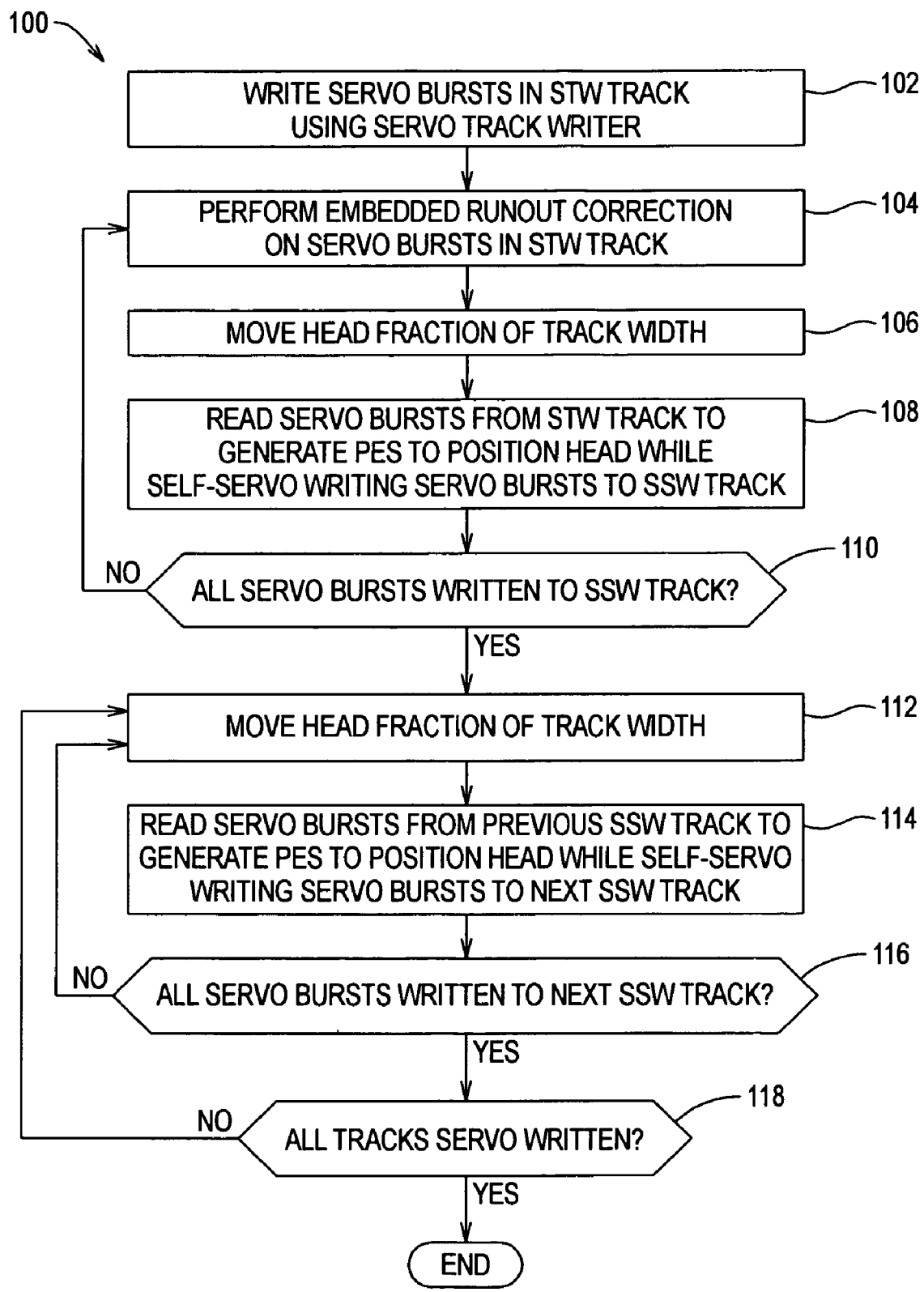
FIG. 5 shows a flowchart of self-servo writing that removes WRO to prevent compound errors.

FIG. 5 shows a flowchart 100 of self-servo writing that removes WRO to prevent compound errors. The flowchart 100 includes the steps of:

1. Writing servo bursts in a STW track using a servo track writer (step 102);
2. Performing (optionally) embedded run-out correction to remove RRO from the servo bursts in the STW track (step 104); and then self-servo writing by
3. Moving the head a fraction of a track width to position the read element to read servo bursts from the STW track and the write element to write servo bursts to a SSW track (step 106);
4. Reading servo bursts from the STW track and using the associated PES to position the head while self-servo writing servo bursts to the SSW track (step 108);
5. Repeating steps (2) to (4) to self-servo write the remaining servo bursts to the SSW track (step 110);
6. Moving the head a fraction of a track width to position the read element to read servo bursts from the previous SSW track and the write element to write servo bursts to the next SSW track (step 112);
7. Reading servo bursts from the previous SSW track and using the associated PES to position the head while self-servo writing servo bursts to the next SSW track (step 114);
8. Repeating steps (6) to (7) to self-servo write the remaining servo bursts to the next SSW track (step 116); and
9. Repeating steps (6) to (8) to self-servo write the remaining tracks on the disk (step 118).

Thus, the flowchart 100 includes servo writing using a servo track writer (step 102) and then self-servo writing (steps 106 to 118).

Figure 6:
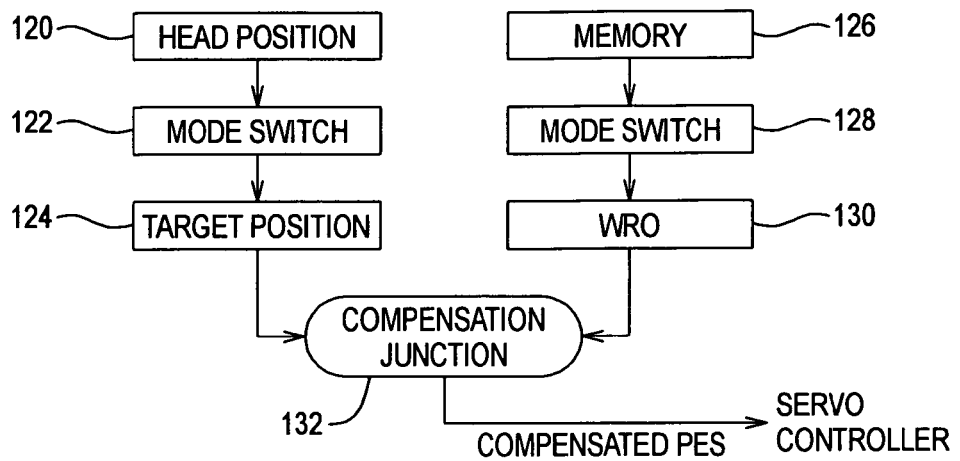
FIG. 6 shows a logic diagram for self-servo writing that removes WRO to prevent compound errors.

FIG. 6 shows a logic diagram for servo writing that removes WRO to prevent compound errors. At head position block 120, the head 14 is positioned at a target position for writing servo bursts to a next track and reading servo bursts from a previously written track. At mode switch block 122, the servo bursts on the previous track that are used to generate the PES are selected. At target position block 124, the target position for the head 14 is selected. At memory block 126, the eight edge errors from the previous track are retrieved from memory. At mode switch block 128, the edge errors are selected according to the relations in Tables I, II or III. At WRO block 130, the WRO is determined based on the selected edge errors. At compensation junction 132, the PES is adjusted by the target position and the WRO to obtain an adjusted PES to position the head 14 for writing the servo bursts to the next track according to the relation:

$$PES(\text{Without } WRO) = \text{Target Head Position} - WRO$$

The track following modes listed in Tables I, II and III have a linear range of N, Q, (N+Q) and (N−Q). The mode switch blocks 122, 128 stitch the eight linear track segments to cover a full track range.

Figure 7:
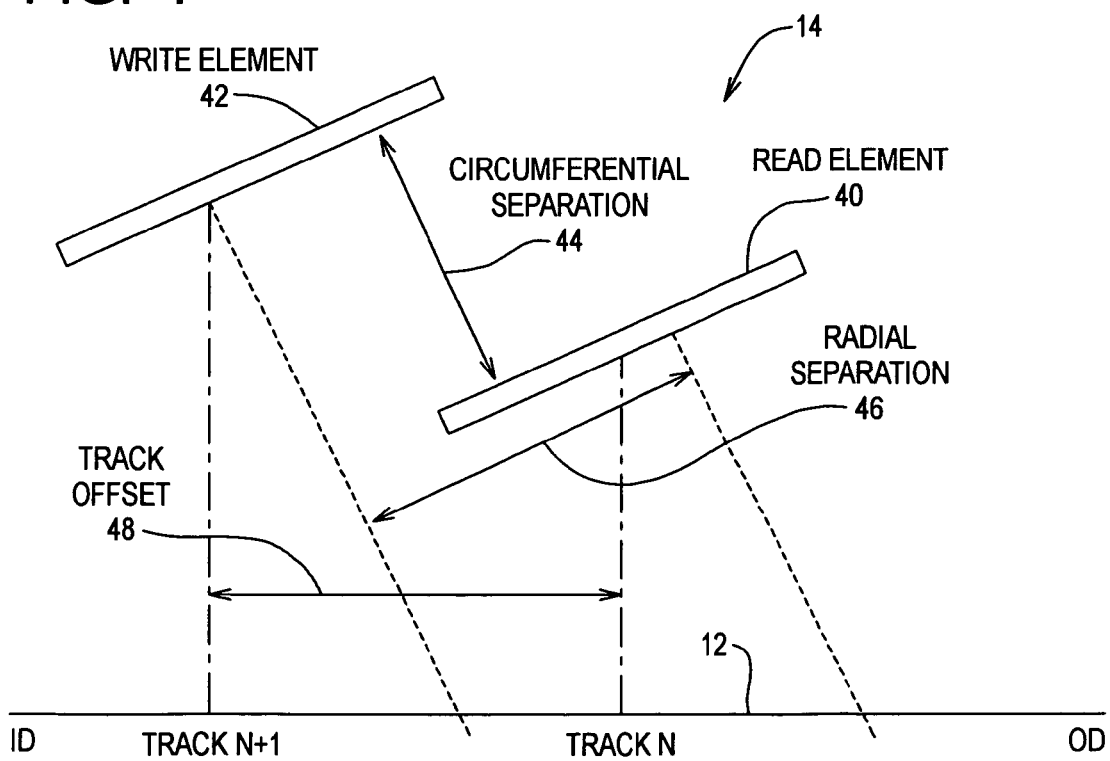
FIG. 7 shows a head with read and write elements having a single track offset.

FIG. 7 shows the head 14 with a single track offset relative to the disk 12. The disk 12 includes an inner diameter (ID) and an outer diameter (OD). The head 14 includes a magneto-resistive read element 40 and a write element 42. The read and write elements 40, 42 have a circumferential separation 44 and a radial separation 46 therebetween. The circumferential separation 44 extends in the circumferential direction (parallel to the track centerline 34), and the radial separation 46 extends in the radial direction (normal to the track centerline 34). Furthermore, the circumferential separation 44 and the radial separation 46 provide a track offset 48 of one track width on the disk 12. As a result, the read element 40 can read servo bursts from track N while the write element 42 writes servo bursts to adjacent track N+1.

Figure 8:
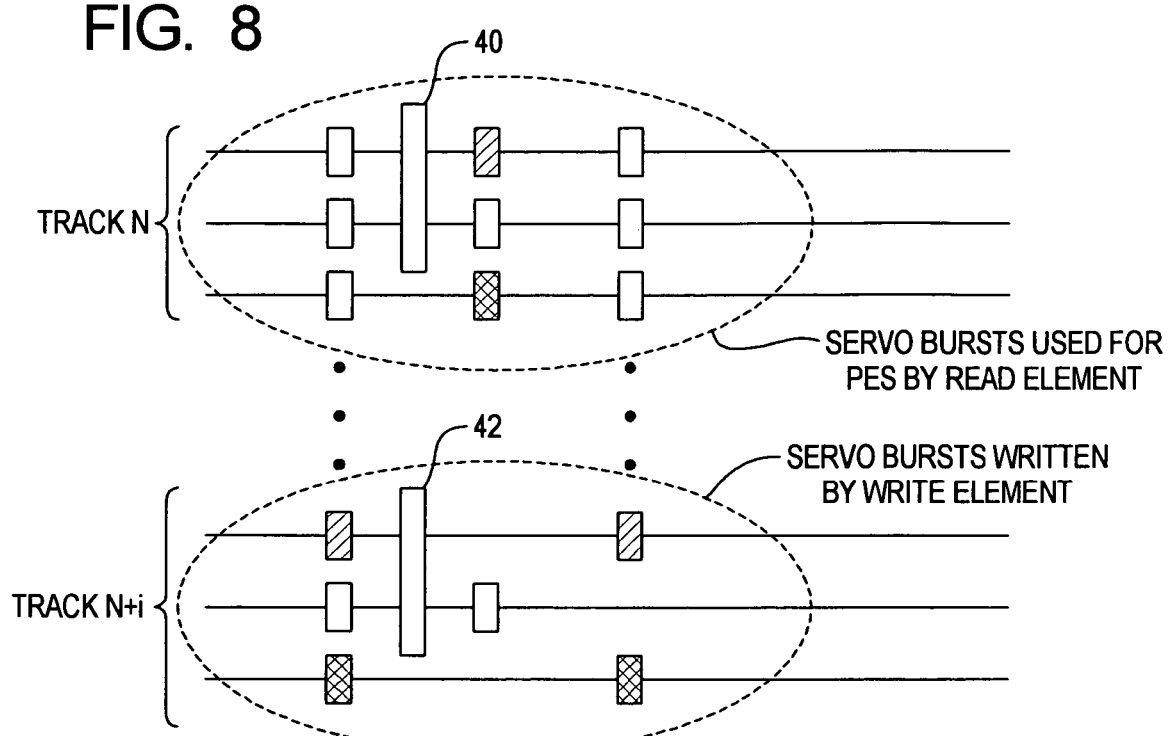
FIG. 8 shows a head with read and write elements having a multiple track offset.

FIG. 8 shows the head 14 with a multiple track offset relative to the disk 12. The read element 40 is positioned on a previously written track N and reads the servo bursts from the previously written track N to generate a PES for servoing the head 14, while the write element 42 writes servo bursts to non-adjacent track N+i, where the integer i is greater than one and based on factors such as track density, skew angle and head geometry. Thus, the track offset 48 is multiple tracks rather than a single track. For example, the integer i can be 2 to 8 such that the write element 42 is two to eight tracks in advance of the read element 40 in the propagation direction from the outer diameter to the inner diameter of the disk 12.

Figure 9:
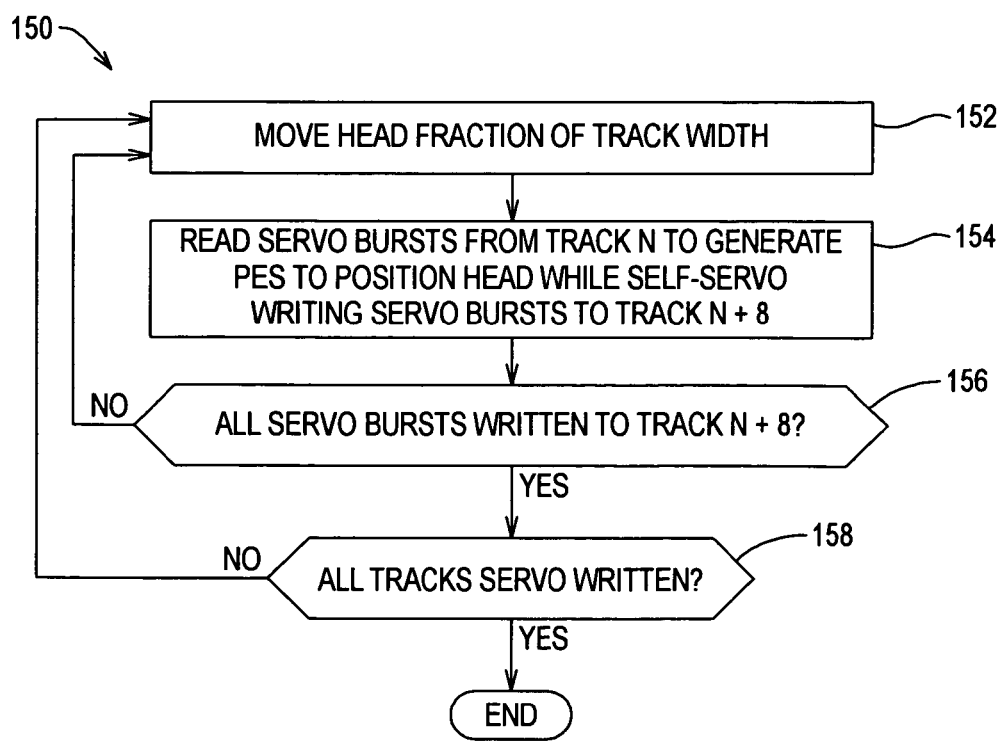
FIG. 9 shows a flowchart of self-servo writing that removes WRO to prevent compound errors with the read and write elements having multiple track offset.

FIG. 9 shows a flowchart 150 of self-servo writing that removes WRO to prevent compound errors while the track offset 48 is eight tracks. The flowchart 150 includes the steps of:

1. Moving the head a fraction of a track width to position the read element to read servo bursts from track N and the write element to write servo bursts to track N+8 (step 152);

2. Reading servo bursts from the track N and using the associated PES to position the head while self-servo writing servo bursts to the track N+8 (step 154);

3. Repeating steps (1) to (2) to self-servo write the remaining servo bursts to the track N+8 (step 156); and 4. Repeating steps (1) to (3) to self-servo write the remaining tracks on the disk (step 158).

The process steps and logic blocks can be implemented in firmware in the servo loop, or in other logic elements in the disk drive 10 such as the controllers 24 and/or 26 or separate components. The firmware can include diagnostics such as reading the edge errors for verification before and after the self-servo writing.

The head 14 can read the servo bursts from the previous track to generate the PES while the head 14 is at a radial position relative to the disk 12 and write the servo bursts to the next track using the PES to position the head 14 while the head 14 remains at the radial position. In other words, the radial position is a propagation step that includes PES corrections. In addition, the head 14 can read the servo bursts from the previous track to generate the PES during a revolution of the disk 12 and write the servo bursts to the next track using the PES during the same or a subsequent revolution of the disk 12. For instance, the PES for each servo sector on the track can be stored in the memory 28 as the head 14 reads the servo bursts from the previous track during a first revolution of the disk 12 and then retrieved from the memory 28 to position the head 14 as the head 14 writes the servo bursts to the next track during a second revolution of the disk 12.

The memory 28 can be allocated for storing the PES of the track that the head 14 is servoing on, and reused from track-to-track in the propagation steps as the self-servo writing proceeds. The memory 28 can be sized to store the number of servo burst edges in a servo sector multiplied by the number of servo sectors on a track. The memory 28 can also be reused after the self-servo writing is completed.

The embedded run-out correction can remove RRO from the STW tracks as well as electronic noise that causes residual WRO during the self-servo writing. For instance, the embedded run-out correction can be applied to adjust the PES if the WRO exceeds a threshold during self-servo writing. Embedded run-out correction is described in the U.S. application Ser. No. 09/753,969, filed on Jan. 2, 2001, which is incorporated herein by reference.

The selected combination of edge errors is a unique combination of edge errors relative to the other combinations of edge errors. The selected combination of edge errors is a function of the track following mode. Furthermore, the selected combination of edge errors can be a single edge error (such as 2 $\Delta A_b$ for mode N in Table II) or multiple edge errors (such as 2 $\Delta A_b - 2 \Delta C_b$ for mode N–Q in Table II).

The present invention is applicable to servo burst patterns with more than four servo bursts or less than four servo bursts, and is not limited to the A, B, C and D servo bursts described herein. Furthermore, different track following modes can be used with corresponding calculations to determine WRO to prevent compound errors.

The present invention has been described in considerable detail with reference to certain preferred versions thereof, however other versions are possible. Therefore, the spirit and scope of the appended claims should not be limited to the description of the preferred versions contained herein.

What is claimed is:

1. In a disk drive that includes a disk and a head that reads from and writes to the disk, wherein the disk drive generates a position error signal (PES) to position the head relative to the disk in response to the head reading servo bursts on the disk, a method for self-servo writing, comprising:
  providing first servo bursts in a first servo sector in a first track on the disk;
  generating PES's in response to the head reading the first servo bursts;
  adjusting the PES's in response to edge errors in the first servo bursts, wherein each PES is adjusted in response to a different combination of the edge errors; and
  self-servo writing second servo bursts in a second servo sector in a second track on the disk using the head and using the adjusted PES's to position the head, wherein the first and second servo sectors are radially aligned and each second servo burst is written using a different adjusted PES.

2. The method of claim 1, wherein the edge errors include top and bottom edge errors.

3. The method of claim 1, wherein the first servo bursts include A, B, C and D servo bursts, the second servo bursts include A, B, C and D servo bursts, the A servo bursts are radially aligned, the B servo bursts are radially aligned, the C servo bursts are radially aligned and the D servo bursts are radially aligned.

4. The method of claim 1, including providing the first servo bursts using a servo track writer that is external to the disk drive.

5. The method of claim 1, including providing the first servo bursts by self-servo writing.

6. The method of claim 1, including adjusting the PES's using eight edge errors and eight combinations of the edge errors.

7. The method of claim 1, including adjusting the PES's using four edge errors and eight combinations of the edge errors.

8. The method of claim 1, including adjusting the PES's using four edge errors and two combinations of the edge errors.

9. The method of claim 1, including adjusting the PES's to remove written-in runout, thereby preventing error propagation from the first track to the second track.

10. The method of claim 1, including performing the method on a sector-by-sector basis for each servo sector in the second track.

11. In a disk drive that includes a disk and a head that reads from and writes to the disk, wherein the disk drive generates a position error signal (PES) to position the head relative to the disk in response to the head reading servo bursts on the disk, a method for self-servo writing, comprising:

providing first servo bursts in a first servo sector in a first track on the disk;

generating PES's in response to the head reading the first servo bursts, wherein each PES is generated while the head is at a different radial position;

adjusting the PES's in response to edge errors in the first servo bursts, wherein each PES is adjusted in response to a different combination of the edge errors; and self-servo writing second servo bursts in a second servo sector in a second track on the disk using the head and using the adjusted PES's to position the head, wherein the first and second servo sectors are radially aligned and each second servo burst is written using a different adjusted PES while the head is at a different radial position.

12. The method of claim 11, wherein the edge errors include top and bottom edge errors.

13. The method of claim 11, wherein the first servo bursts include A, B, C and D servo bursts, the second servo bursts include A, B, C and D servo bursts, the A servo bursts are radially aligned, the B servo bursts are radially aligned, the C servo bursts are radially aligned and the D servo bursts are radially aligned.

14. The method of claim 11, including providing the first servo bursts using a servo track writer that is external to the disk drive.

15. The method of claim 11, including providing the first servo bursts by self-servo writing.

16. The method of claim 11, including adjusting the PES's using eight edge errors and eight combinations of the edge errors.

17. The method of claim 11, including adjusting the PES's using four edge errors and eight combinations of the edge errors.

18. The method of claim 11, including adjusting the PES's using four edge errors and two combinations of the edge errors.

19. The method of claim 11, including adjusting the PES's to remove written-in runout, thereby preventing error propagation from the first track to the second track.

20. The method of claim 11, including performing the method on a sector-by-sector basis for each servo sector in the second track.

21. In a disk drive that includes a disk and a head that reads from and writes to the disk, wherein the disk drive generates a position error signal (PES) to position the head relative to the disk in response to the head reading servo bursts on the disk, a method for self-servo writing, comprising:

providing first servo bursts in a first servo sector in a first track on the disk;

generating PES's in response to the head reading the first servo bursts, wherein each PES is generated during a different revolution of the disk;

adjusting the PES's in response to edge errors in the first servo bursts, wherein each PES is adjusted in response to a different combination of the edge errors; and self-servo writing second servo bursts in a second servo sector in a second track on the disk using the head and using the adjusted PES's to position the head, wherein the first and second servo sectors are radially aligned and each second servo burst is written using a different adjusted PES during a different revolution of the disk.

22. The method of claim 21, wherein the edge errors include top and bottom edge errors.

23. The method of claim 21, wherein the first servo bursts include A, B, C and D servo bursts, the second servo bursts include A, B, C and D servo bursts, the A servo bursts are radially aligned, the B servo bursts are radially aligned, the C servo bursts are radially aligned and the D servo bursts are radially aligned.

24. The method of claim 21, including providing the first servo bursts using a servo track writer that is external to the disk drive.

25. The method of claim 21, including providing the first servo bursts by self-servo writing.

26. The method of claim 21, including adjusting the PES's using eight edge errors and eight combinations of the edge errors.

27. The method of claim 21, including adjusting the PES's using four edge errors and eight combinations of the edge errors.

28. The method of claim 21, including adjusting the PES's using four edge errors and two combinations of the edge errors.

29. The method of claim 21, including adjusting the PES's to remove written-in runout, thereby preventing error propagation from the first track to the second track.

30. The method of claim 21, including performing the method on a sector-by-sector basis for each servo sector in the second track.

31. In a disk drive that includes a disk and a head that reads from and writes to the disk, wherein the disk drive generates a position error signal (PES) to position the head relative to the disk in response to the head reading servo bursts on the disk, a method for self-servo writing, comprising:

providing first servo bursts in a first servo sector in a first track on the disk;

generating PES's in response to the head reading the first servo bursts, wherein each PES is generated while the head is at a different radial position during a different revolution of the disk;

adjusting the PES's in response to edge errors in the first servo bursts, wherein each PES is adjusted in response to a different combination of the edge errors; and self-servo writing second servo bursts in a second servo sector in a second track on the disk using the head and using the adjusted PES's to position the head, wherein the first and second servo sectors are radially aligned, each second servo burst is written using a different adjusted PES while the head is at a different radial position during a different revolution of the disk, and for each corresponding PES and second servo burst the PES is generated and the second servo burst is written while the head is at the same radial position during the same revolution of the disk.

32. The method of claim 31, wherein the edge errors include top and bottom edge errors.

33. The method of claim 31, wherein the first servo bursts include A, B, C and D servo bursts, the second servo bursts include A, B, C and D servo bursts, the A servo bursts are radially aligned, the B servo bursts are radially aligned, the C servo bursts are radially aligned and the D servo bursts are radially aligned.

34. The method of claim 31, including providing the first servo bursts using a servo track writer that is external to the disk drive.

35. The method of claim 31, including providing the first servo bursts by self-servo writing.

36. The method of claim 31, including adjusting the PES's using eight edge errors and eight combinations of the edge errors.

37. The method of claim 31, including adjusting the PES's using four edge errors and eight combinations of the edge errors.

38. The method of claim 31, including adjusting the PES's using four edge errors and two combinations of the edge errors.

39. The method of claim 31, including adjusting the PES's to remove written-in runout, thereby preventing error propagation from the first track to the second track.

40. The method of claim 31, including performing the method on a sector-by-sector basis for each servo sector in the second track.

41. In a disk drive that includes a disk and a head that reads from and writes to the disk, wherein the disk drive generates a position error signal (PES) to position the head relative to the disk in response to the head reading servo bursts on the disk, a method for self-servo writing, comprising:

providing first servo bursts in a first servo sector in a first track on the disk, wherein the first servo bursts include edge errors;

positioning the head at a first radial position;

generating a first PES in response to the head reading a first combination of the first servo bursts while the head is at the first radial position;

adjusting the first PES in response to a first combination of the edge errors in the first combination of the first servo bursts, thereby reducing written-in runout in the first adjusted PES;

self-servo writing a second servo burst in a second servo sector in a second track on the disk using the head and using the first adjusted PES to position the head while the head is at the first radial position;

positioning the head at a second radial position, wherein the first and second radial positions are offset by a fraction of a track width;

generating a second PES in response to the head reading a second combination of the first servo bursts while the head is at the second radial position;

adjusting the second PES in response to a second combination of the edge errors in the second combination of the first servo bursts, thereby reducing written-in runout in the second adjusted PES; and self-servo writing another second servo burst in the second servo sector using the head and using the second adjusted PES to position the head while the head is at the second radial position.

42. The method of claim 41, wherein the first servo bursts include A, B, C and D circumferentially sequential, radially offset servo bursts, the second servo bursts include A, B, C and D circumferentially sequential, radially offset servo bursts, the A servo bursts are radially aligned, the B servo bursts are radially aligned, the C servo bursts are radially aligned and the D servo bursts are radially aligned.

43. The method of claim 42, wherein the first and second combinations of the edge errors are selected from eight combinations of the edge errors.

44. The method of claim 42, wherein the first and second combinations of the edge errors are selected from two combinations of the edge errors.

45. The method of claim 42, wherein the edge errors include top and bottom edge errors for the A, B, C and D first servo bursts, thereby providing eight edge errors.

46. The method of claim 42, wherein the edge errors include top or bottom edge errors for the A, B, C and D first servo bursts, thereby providing four edge errors.

47. The method of claim 42, wherein the edge errors include top and bottom edge errors for the C and D first servo bursts and exclude top and bottom edge errors for the A and B first servo bursts, thereby providing four edge errors.

48. The method of claim 42, wherein the edge errors include top and bottom edge errors for the A, B, C and D first servo bursts, thereby providing eight edge errors, and the first and second combinations of the edge errors are selected from eight combinations of the edge errors.

49. The method of claim 48, wherein the first PES is generated during a first track following mode, the first combination of the edge errors is selected from the eight combinations of the edge errors based on the first track following mode, the second PES is generated during a second track following mode, and the second combination of the edge errors is selected from the eight combinations of the edge errors based on the second track following mode.

50. The method of claim 49, wherein the first and second track following modes are selected from eight track following modes defined as N, Q, −N, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

51. The method of claim 42, wherein the edge errors include top or bottom edge errors for the A, B, C and D first servo bursts, thereby providing four edge errors, and first and second combinations of the edge errors are selected from eight combinations of the edge errors.

52. The method of claim 51, wherein the first PES is generated during a first track following mode, the first combination of the edge errors is selected from the eight combinations of the edge errors based on the first track following mode, the second PES is generated during a second track following mode, and the second combination of the edge errors is selected from the eight combinations of the edge errors based on the second track following mode.

53. The method of claim 52, wherein the first and second track following modes are selected from eight track following modes defined as N, Q, −N, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

54. The method of claim 42, wherein the edge errors include top and bottom edge errors for the C and D first servo bursts and exclude top and bottom edge errors for the A and B first servo bursts, thereby providing four edge errors, and the first and second combinations of the edge errors are selected from two combinations of the edge errors.

55. The method of claim 54, wherein the first PES is generated during a first track following mode, the first combination of the edge errors is selected from the two combinations of the edge errors based on the first track following mode, the second PES is generated during a second track following mode, and the second combination of the edge errors is selected from the two combinations of the edge errors based on the second track following mode.

56. The method of claim 55, wherein the first and second track following modes are selected from six track following modes defined as Q, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

57. The method of claim 41, wherein the first and second tracks are adjacent.

58. The method of claim 41, wherein the first and second tracks are not adjacent.

59. The method of claim 41, including providing the first servo bursts using a servo track writer that is external to the disk drive.

60. The method of claim 41, including providing the first servo bursts by self-servo writing.

61. In a disk drive that includes a disk and a head that reads from and writes to the disk, wherein the disk drive generates a position error signal (PES) to position the head relative to the disk in response to the head reading servo bursts on the disk, a method for self-servo writing, comprising:
- providing first servo bursts in a first servo sector in a first track on the disk, wherein the first servo bursts include edge errors;
- positioning the head at a first radial position;
- generating a first PES in response to the head reading a first combination of the first servo bursts while the head is at the first radial position during a first revolution of the disk;
- adjusting the first PES in response to a first combination of the edge errors in the first combination of the first servo bursts, thereby reducing written-in runout in the first adjusted PES;
- self-servo writing a second servo burst in a second servo sector in a second track on the disk using the head and using the first adjusted PES to position the head while the head is at the first radial position during the first revolution of the disk; then positioning the head at a second radial position, wherein the first and second radial positions are offset by a fraction of a track width;
- generating a second PES in response to the head reading a second combination of the first servo bursts while the head is at the second radial position during a second revolution of the disk;
- adjusting the second PES in response to a second combination of the edge errors in the second combination of the first servo bursts, thereby reducing written-in runout in the second adjusted PES; and
- self-servo writing another second servo burst in the second servo sector using the head and using the second adjusted PES to position the head while the head is at the second radial position during the second revolution of the disk.

62. The method of claim 61, wherein the first servo bursts include A, B, C and D circumferentially sequential, radially offset servo bursts, the second servo bursts include A, B, C and D circumferentially sequential, radially offset servo bursts, the A servo bursts are radially aligned, the B servo bursts are radially aligned, the C servo bursts are radially aligned and the D servo bursts are radially aligned.

63. The method of claim 62, wherein the first and second combinations of the edge errors are selected from eight combinations of the edge errors.

64. The method of claim 62, wherein the first and second combinations of the edge errors are selected from two combinations of the edge errors.

65. The method of claim 62, wherein the edge errors include top and bottom edge errors for the A, B, C and D first servo bursts, thereby providing eight edge errors.

66. The method of claim 62, wherein the edge errors include top or bottom edge errors for the A, B, C and D first servo bursts, thereby providing four edge errors.

67. The method of claim 62, wherein the edge errors include top and bottom edge errors for the C and D first servo bursts and exclude top and bottom edge errors for the A and B first servo bursts, thereby providing four edge errors.

68. The method of claim 62, wherein the edge errors include top and bottom edge errors for the A, B, C and D first servo bursts, thereby providing eight edge errors, and the first and second combinations of the edge errors are selected from eight combinations of the edge errors.

69. The method of claim 68, wherein the first PES is generated during a first track following mode, the first combination of the edge errors is selected from the eight combinations of the edge errors based on the first track following mode, the second PES is generated during a second track following mode, and the second combination of the edge errors is selected from the eight combinations of the edge errors based on the second track following mode.

70. The method of claim 69, wherein the first and second track following modes are selected from eight track following modes defined as N, Q, −N, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

71. The method of claim 62, wherein the edge errors include top or bottom edge errors for the A, B, C and D first servo bursts, thereby providing four edge errors, and first and second combinations of the edge errors are selected from eight combinations of the edge errors.

72. The method of claim 71, wherein the first PES is generated during a first track following mode, the first combination of the edge errors is selected from the eight combinations of the edge errors based on the first track following mode, the second PES is generated during a second track following mode, and the second combination of the edge errors is selected from the eight combinations of the edge errors based on the second track following mode.

73. The method of claim 72, wherein the first and second track following modes are selected from eight track following modes defined as N, Q, −N, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

74. The method of claim 62, wherein the edge errors include top and bottom edge errors for the C and D first servo bursts and exclude top and bottom edge errors for the A and B first servo bursts, thereby providing four edge errors, and the first and second combinations of the edge errors are selected from two combinations of the edge errors.

75. The method of claim 74, wherein the first PES is generated during a first track following mode, the first combination of the edge errors is selected from the two combinations of the edge errors based on the first track following mode, the second PES is generated during a second track following mode, and the second combination of the edge errors is selected from the two combinations of the edge errors based on the second track following mode.

76. The method of claim 75, wherein the first and second track following modes are selected from six track following modes defined as Q, −Q, (N+Q), (N−Q), −(N+Q) and −(N−Q), N is a null signal based on a difference between read signals from the A and B first servo bursts, and Q is a quadrature signal based on a difference between read signals from the C and D first servo bursts.

77. The method of claim 61, wherein the first and second tracks are adjacent.

78. The method of claim 61, wherein the first and second tracks are not adjacent.

79. The method of claim 16, including providing the first servo bursts using a servo track writer that is external to the disk drive.

80. The method of claim 61, including providing the first servo bursts by self-servo writing.

* * * * *